(12) United States Patent
Tadeski et al.

(10) Patent No.: US 10,353,927 B2
(45) Date of Patent: Jul. 16, 2019

(54) CATEGORIZING COLUMNS IN A DATA TABLE

(71) Applicant: Hewlett Packard Enterprise Development LP, Houston, TX (US)

(72) Inventors: Inbal Tadeski, Yehud (IL); Eli Hayoon, Haifa (IL); Hadas Kogan, Zichron Yaacov (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 213 days.

(21) Appl. No.: 15/324,043

(22) PCT Filed: Jul. 10, 2014

(86) PCT No.: PCT/US2014/046189
§ 371 (c)(1),
(2) Date: Jan. 5, 2017

(87) PCT Pub. No.: WO2016/007162
PCT Pub. Date: Jan. 14, 2016

(65) Prior Publication Data
US 2017/0161358 A1 Jun. 8, 2017

(51) Int. Cl.
*G06F 16/22* (2019.01)
*G06F 16/23* (2019.01)
*G06F 16/28* (2019.01)
*G06F 16/2457* (2019.01)

(52) U.S. Cl.
CPC .......... *G06F 16/285* (2019.01); *G06F 16/221* (2019.01); *G06F 16/2365* (2019.01); *G06F 16/24578* (2019.01)

(58) Field of Classification Search
CPC ......... G06F 17/30598; G06F 17/30315; G06F 17/30371; G06F 17/3053; G06F 16/285; G06F 16/221; G06F 16/2365; G06F 16/24578

See application file for complete search history.

(56) References Cited

U.S. PATENT DOCUMENTS

| 6,687,704 B1 | 2/2004 | Russell |
| 7,849,048 B2 | 12/2010 | Langseth et al. |
| 8,548,982 B2 | 10/2013 | Weissman et al. |

(Continued)

FOREIGN PATENT DOCUMENTS

WO  WO-2015/183306 A1  12/2015

OTHER PUBLICATIONS

"EMM Open Source Intelligence Suite", published: Mar. 20, 2013; http://btn.frontex.europa.eu/system/files/private/resources/tools/emm-osint-suite_productinfo.pd.

(Continued)

*Primary Examiner* — Jay A Morrison

(57) ABSTRACT

In an example, columns in a data table may be categorized according to a data type based upon an analysis of data elements contained in each column with a grammar file. The data type of a column be may be categorized as one of a general data type and a specific data type. In addition, the grammar file may be expanded by at least one of adding a data element to the grammar file in response to a column being categorized as a specific data type and inserting a new data type to the grammar file in response to a column being categorized as a general data type.

16 Claims, 5 Drawing Sheets

(56) References Cited

U.S. PATENT DOCUMENTS

| | | | |
|---|---|---|---|
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2009/0271419 A1* | 10/2009 | Bornhoevd | G06F 17/30292 |
| 2010/0293163 A1 | 11/2010 | McLachlan et al. | |
| 2011/0040552 A1 | 2/2011 | Van Guilder et al. | |
| 2011/0145251 A1 | 6/2011 | Lee et al. | |
| 2012/0221935 A1 | 8/2012 | Benhase et al. | |
| 2013/0124964 A1 | 5/2013 | Viegas et al. | |
| 2013/0144833 A1* | 6/2013 | Ivanova | G06F 17/30592 707/600 |

OTHER PUBLICATIONS

Niu C. et al.; "A Bootstrapping Approach to Information Extraction Domain Porting"; published: May 25, 2004; http://www.ai.sri.com/~muslea/atem-04/niu.pdf.

Nixon, L. et al; "D5.1 Planetdata Data Management Tools Catalogue and Access Portal"; published: Sep. 30, 2011; http://www.planet-data.eu/sites/default/files/pr-material/deliverables/D5.1_Data_management_tools_catalogue_and_access_portal.pdf.

Srihari, R.K. et al.; "InfoXtract: A Customizable Intermediate Level Information Extraction Engine"; published: Apr. 17, 2003; http://acl.ldc.upenn.edu/W/W03/W03-0808.pdf.

Ben-David, et al., "Enterprise Data Classification Using Semantic Web Technologies", The Semantic; Web—ISWC 2010, Part II, LNCS 6497, Springer-Verlag Berlin Heidelberg, 2010, pp. 66-81.

Butler, et al., "Semantic Middleware for E-Discovery", Proceedings of the 3rd IEEE International Conference on Semantic Computing, Sep. 2009, 6 pages.

Maedche et al., "Ontologles for Enterprise Knowledge Management", IEEE Intelligent Systems, vol. 18, No. 2, 2003, pp. 26-33.

* cited by examiner

300

┌─────────────────────────────────────┐
│ CATEGORIZE EACH OF THE COLUMNS ACCORDING TO │
│ A DATA TYPE BASED UPON AN ANALYSIS OF DATA │
│ ELEMENTS CONTAINED IN EACH COLUMN WITH A │
│ GRAMMAR FILE, WHEREIN THE DATA TYPE IS ONE OF │
│ A GENERAL DATA TYPE OR A SPECIFIC DATA TYPE │
│ 310 │
└─────────────────────────────────────┘
                    │
                    ▼
┌─────────────────────────────────────┐
│ EXPAND THE GRAMMAR FILE BY AT LEAST ONE OF │
│ ADDING A DATA ELEMENT TO THE GRAMMAR FILE IN │
│ RESPONSE TO THE COLUMN BEING CATEGORIZED AS │
│ A SPECIFIC DATA TYPE AND INSERTING A NEW DATA │
│ TYPE TO THE GRAMMAR FILE IN RESPONSE TO THE │
│ COLUMN BEING CATEGORIZED AS A GENERAL DATA │
│ TYPE │
│ 320 │
└─────────────────────────────────────┘

FIG. 3

CATEGORIZING COLUMNS IN A DATA TABLE

BACKGROUND

Databases are computerized data storage and retrieval systems that are organized in any of a number of different manners. A typical manner in which databases are organized is through the storage of data in multiple tables composed of columns and rows. The columns typically identify a category or topic and the rows typically include data pertaining to a particular entity or feature. As an example, the category of a column may be "clients" and each of the rows may identify a particular client. The tables in databases often contain large numbers of uncategorized columns.

BRIEF DESCRIPTION OF THE DRAWINGS

Features of the present disclosure are illustrated by way of example and not limited in the following figure(s), in which like numerals indicate like elements, in which:

FIG. 3 shows a flow chart of a method for categorizing columns in a data table, according to an example of the present disclosure;

DETAILED DESCRIPTION

Figure 1:
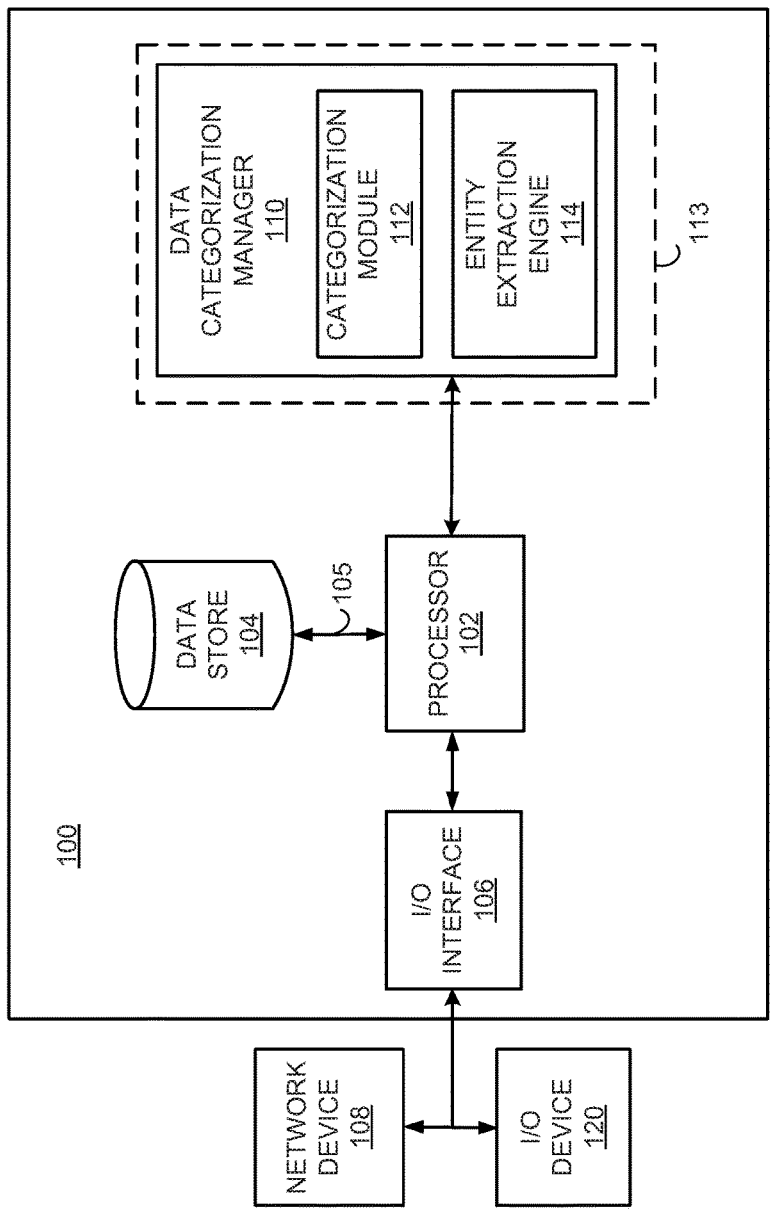
FIG. 1 shows a simplified block diagram of a computing device to categorize columns using named entity extraction, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a method for categorizing columns using named entity extraction. The disclosed method, for instance, may be implemented to preprocess data for ease of search and access by various software applications that utilize the data. Also disclosed herein are a computing device for implementing the methods and a non-transitory computer readable medium on which is stored machine readable instructions that implement the methods.

According to an example, the disclosed methods may categorize columns in a data table according to a data type based upon an analysis of data elements (i.e., entities) contained in each column with a grammar file (i.e., dictionary) of data elements (or entities). According to an example, data may be generalized to any data that contains elements (equivalent to rows) and fields (equivalent to columns) and may be transformed to have the form of a data table. In this example, for instance, data received in a format other than in a table format, such as an XML file, may be transformed into the form of a data table. The grammar file, for instance, may be a file that classifies data elements to a predefined category.

The data type of a column may be categorized as one of a general data type and a specific data type. The data type of the data elements in each column may be either a general data type (i.e., non-named entity type) or a specific data type (i.e., named entity type). The general data type includes standard data types such as numerals, strings, or temporal values. The specific data type includes named entities that are derived using a grammar file and a named entity extraction engine, such as persons, companies, locations, currencies, and the like.

In addition, in the methods disclosed herein, the grammar file may be expanded by at least one of adding a data element to the grammar file in response to a column being categorized as a specific data type and inserting a new data type to the grammar file in response to a column being categorized as a general data type. Specifically, in response to a column being categorized as a specific or named entity data type, unrecognized data elements in the column may be extracted and added to a grammar file for the specific data type. An unrecognized data element may include data elements that were not previously defined or included in the grammar file. In response to the column being categorized as a general data type and containing data elements that can be named entities, a similarity between the data elements in the column may be identified to create a new specific data type for the data elements and the data elements may be inserted into a grammar file for the newly created specific data type. According to an example, a similarity of the data elements in the column may be measured against data elements of different category columns to determine to identify a newly created specific data type and to determine whether to present the newly created specific data type to a user to insert into the grammar file.

Through implementation of the examples disclosed herein, unknown data from a data table may be categorized for applications that deal with structured data. The disclosed examples may include a data categorization method and a named entity extraction method to derive information from structured and/or unstructured data. The data categorization method may identify a data type for each column in a structured data table. The named entity extraction method may further identify specific data types in the column. That is, in addition to general data types (e.g. numeric, temporal, string, etc.), the disclosed methods may also identify specific data types (e.g., companies, geographies, etc.). The disclosed examples may also automatically expand grammar files that are used in the named entity extraction method by adjusting the grammar files to a specific domain. In addition, the disclosed methods may identify and create new data types to further expand the grammar files.

Generally speaking, the methods and computing devices disclosed herein may provide rich and accurate metadata that may be used for data manipulations and conversions, filtering of data elements, searching of data elements for relevant information, and displaying of rich information to a user. For example, the disclosed examples may provide feedback from a categorization module to a named entity extraction engine. This feedback may enable an automatic customization of a named entities extraction engine to a specific user domain and to specific user data. Typically, named entity recognition is based on general rules and on grammar files that are compliant with every data set. However, additional work is usually required to customize the grammar files to a specific domain. While other approaches are either manual or use complicated and costly techniques, the disclosed examples may customize the grammar files in a fast, simple, and accurate manner. Further, the disclosed examples may automatically create new data types based on the data elements in a data table to augment the predefined set of data types in the grammar files.

With reference to FIG. 1, there is shown a block diagram of a computing device 100 that is to categorize columns in a data table according to an example of the present disclosure. It should be understood that the computing device 100 may include additional components and that one or more of the components described herein may be removed and/or modified without departing from a scope of the computing device 100.

The computing device 100 is depicted as including a processor 102, a data store 104, an input/output (I/O) interface 106, and a data categorization manager 110. For example, the computing device 100 may be a desktop computer, a laptop computer, a smartphone, a computing tablet, or any type of computing device. Also, the components of the computing device 100 are shown on a single computer as an example and in other examples the components may exist on multiple computers. The computing device 100 may store or manage high-dimensional data in a separate computing device, for instance, through a network device 108, which may include, for instance, a router, a switch, a hub, and the like. The data store 104 may include physical memory such as a hard drive, an optical drive, a flash drive, an array of drives, or any combinations thereof, and may include volatile and/or non-volatile data storage.

The data categorization manager 110 is depicted as including a categorization module 112 and an entity extraction engine 114. The processor 102, which may be a microprocessor, a micro-controller, an application specific integrated circuit (ASIC), or the like, is to perform various processing functions in the computing device 100. The processing functions may include the functions of the categorization module 112 and the entity extraction engine 114 of the data categorization manager 110.

The categorization module 112, for example, identifies and categorizes a data type for each column in a data table based on a type of the data elements in each column. The categorization module 112 may identify and classify the data type as a general data type or a specific data type. According to an example, the categorization module 112 may add unrecognized data elements in a column to a grammar file according to a specific data type responsive to the column being identified as the specific data type. In response to the column being identified as the general data type, the categorization module 112 may identify a similarity between the data elements in a column, create a new specific data type for the data elements based on the similarity, receive a user validation of the new specific data type, and insert the data elements to a grammar file for the new specific data type as discussed further below. The entity extraction engine 114, for example, extracts named entities and unrecognized data elements from a column.

In an example, the data categorization manager 110 includes machine readable instructions stored on a non-transitory computer readable medium 113 and executed by the processor 102. Examples of the non-transitory computer readable medium 113 may include dynamic random access memory (DRAM), electrically erasable programmable read-only memory (EEPROM), magnetoresistive random access memory (MRAM), memristor, flash memory, hard drive, and the like. The computer readable medium 113 may be included in the data store 104 or may be a separate storage device. In another example, the data categorization manager 110 includes a hardware device, such as a circuit or multiple circuits arranged on a board. In this example, the categorization module 112 and the entity extraction engine 114 are circuit components or individual circuits, such as an embedded system, an ASIC, or a field-programmable gate array (FPGA).

The processor 102 may be coupled to the data store 104 and the I/O interface 106 by a bus 105, where the bus 105 may be a communication system that transfers data between various components of the computing device 100. In examples, the bus 105 may be a Peripheral Component Interconnect (PCI), Industry Standard Architecture (ISA), PCI-Express, HyperTransport®, NuBus, a proprietary bus, and the like.

The I/O interface 106 includes a hardware and/or a software interface. The I/O interface 106 may be a network interface connected to a network through the network device 108, over which the data categorization manager 110 may receive and communicate information. For example, the I/O interface 106 may be a wireless local area network (WLAN) or a network interface controller (NIC). The WLAN may link the computing device 100 to the network device 108 through a radio signal. Similarly, the NIC may link the computing device 100 to the network device 108 through a physical connection, such as a cable. The computing device 100 may also link to the network device 108 through a wireless wide area network (WWAN), which uses a mobile data signal to communicate with mobile phone towers. The processor 102 may store information received through the I/O interface 106 in the data store 104 and may use the information in implementing the categorization module 112 and the entity extraction engine 114.

The I/O interface 106 may be a device interface to connect the computing device 100 to one or more I/O devices 120. The I/O devices 120 may include, for example, a display, a keyboard, a mouse, and a pointing device, wherein the pointing device may include a touchpad or a touchscreen. The I/O devices 120 may be built-in components of the computing device 100, or located externally to the computing device 100. The display may be a display screen of a computer monitor, a smartphone, a computing tablet, a television, or a projector.

Figure 2:
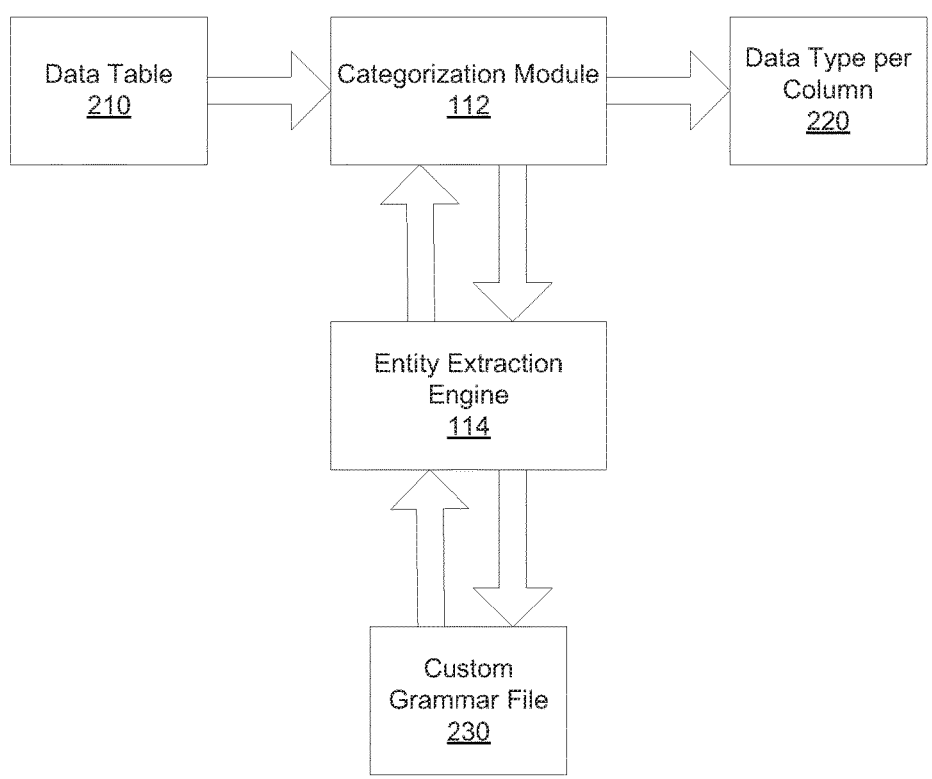
FIG. 2 shows a data flow diagram of a data categorization manager, according to an example of the present disclosure.

With reference to FIG. 2, there is shown a data flow diagram 200 for the data categorization manager 110, according to an example of the present disclosure. The data categorization manager 110 may be implemented, for example, by the processor 102 of computing device 100 as depicted in FIG. 1.

In FIG. 2, the categorization module 112 may receive a data table 210 that includes a plurality of columns of data elements. The categorization module 112 may categorize each of the columns according to a data type 220 of the data elements contained in each of the columns. The data type of the data elements may either be a general data type or a specific data type. A general data type may be assigned to a column if the data elements in the column belong to a general category such as a numeric value, a string, and/or a temporal value. In particular, general data types may, for example, include a character, varchar, binary, boolean, varbinary, integer, smallint, integer, bigint, decimal, numeric, float, double precision, date, time, timestamp, interval, array, multiset, extensible modeling language (XML), etc. A specific data type may be assigned to a column if, for instance, a majority of the data elements in the column are recognized as named entities using a grammar file. Specific data types may include named entities such as persons, companies, locations, currencies, and the like. According to an example, the data flow diagram 200 of the data categorization manager 110 may be independent for each column of the table and may be parallelized among multiple columns.

The categorization module 112 may request input from a user regarding which data types are of interest to the user and should be identified from the data table 210. For instance, a user may select the identification of general data types such as a character string and date, and specific data types such as companies and geographies for identification and categorization. Therefore, the categorization module 112 may execute a set of data analyzers 222 for the selected data types on each of the plurality of columns in the data table 210. That is, the categorization module 112 may execute data analyzers 222, which may include any of a character string data analyzer, a date data analyzer, a company data analyzer, a geographical data analyzer, etc, on each column in the data table 210. Alternatively, the categorization module 112 may execute a named entity analyzer that contains a grammar file for both the company data and the geographical data to identify the selected specific data types.

Each of the data analyzers 222 may output a relevance score to the categorization module 112. The relevance scores may each be a function of a frequency of data elements in the column that correspond to the data type of the respective data analyzer 222. For instance, the named entity analyzer 222 may output a relevance score indicating that 70% of the data elements in a first column are recognized as company names and a relevance score indicating that 0% of the data elements in the first column are recognized as geographical locations. According to an example, all of the relevance scores received from each data analyzer may 222 be ranked based on a predefined priority. For instance, the predefined priority may assign a higher priority to a data type having higher relevance score. Additionally, in the predefined priority, a higher priority may be assigned to specific data types over general data types. However, the predefined priority is not limited to these examples. According to another example, any semantic prioritization may be set, such as countries over general geographies, integers over floats, or etc.

To identify specific data types such as companies and geographies, the named entity analyzer 222 may call the entity extraction engine 114 to extract the data elements contained within a column of the data table 210. Particularly, the named entity analyzer 222 of the categorization module 112 may use a grammar file to recognize data elements in the column and map the recognized data elements to predefined specific data types based on the grammar file. Thus, by analyzing the data elements extracted by the entity extraction engine 114, the named entity analyzer 222 may determine that an analyzed column contains a high frequency of a particular specific data type according to the grammar file. As discussed above, the categorization module 112 may then categorize the column based on a predefined priority.

According to an example, the data categorization manager 110 may expand the grammar file 230 by either adding a data element to the grammar file in response to the column being categorized as a specific data type or inserting a new data type to the grammar file in response to the column being categorized as a general data type. For example, in response to the categorization module 112 categorizing a column as being a specific data type, the entity extraction engine 114 may extract the unrecognized data elements in the column. An unrecognized data element may include data elements that were not previously defined or included in the grammar file. The categorization module 112, for instance, may then add the unrecognized data elements to the grammar file 230 for the specific data type. In this example, the categorization module 112 may categorize a column as containing geographical data elements. However, not all of the data elements in the column may have been recognized as geographical data elements based upon the analysis with the grammar file 230. For instance, the data elements of Maryland and Virginia may be recognized as geographical data elements in the column, but the data element of Missouri may not be recognized as a geographical data element based upon the analysis with the grammar file 230. Accordingly, the categorization module 112 may add the unrecognized data element of Missouri to the grammar file 230 under the specific data type of geographies.

According to another example, in response to a column being categorized as a general data type, the categorization module 112 may, for instance, identify a similarity between the data elements in the column, create a new specific data type for the data elements based on the identified similarity, and insert the data elements to the grammar file 230 according to the new specific data type. For example, consider that the data table 210 includes a column of products. In this example, also consider that the grammar file 230 does not contain a grammar to identify product names. Since the product data elements are not identified as specific data types, the column containing the product data elements may not be categorized as having a general data type according to the relevance score. The data categorization manager 110, however, may identify that the column contains a set of similar data elements such as "widgets", "parts" and "tools" and propose a new specific data type of "product" to a user. Once a user, for instance, validates the new specific data type, the data categorization manager 110 may create a new specific data type for "product" based on the similarity and insert the data elements from the column to the grammar file 230 under the new specific data type of "product." Therefore, the data categorization manager 110 may expand the custom grammar file 230 by either adding a data element to the grammar file in response to the column being categorized as a specific data type or inserting a new data type to the grammar file in response to the column being categorized as a general data type.

Figure 4:
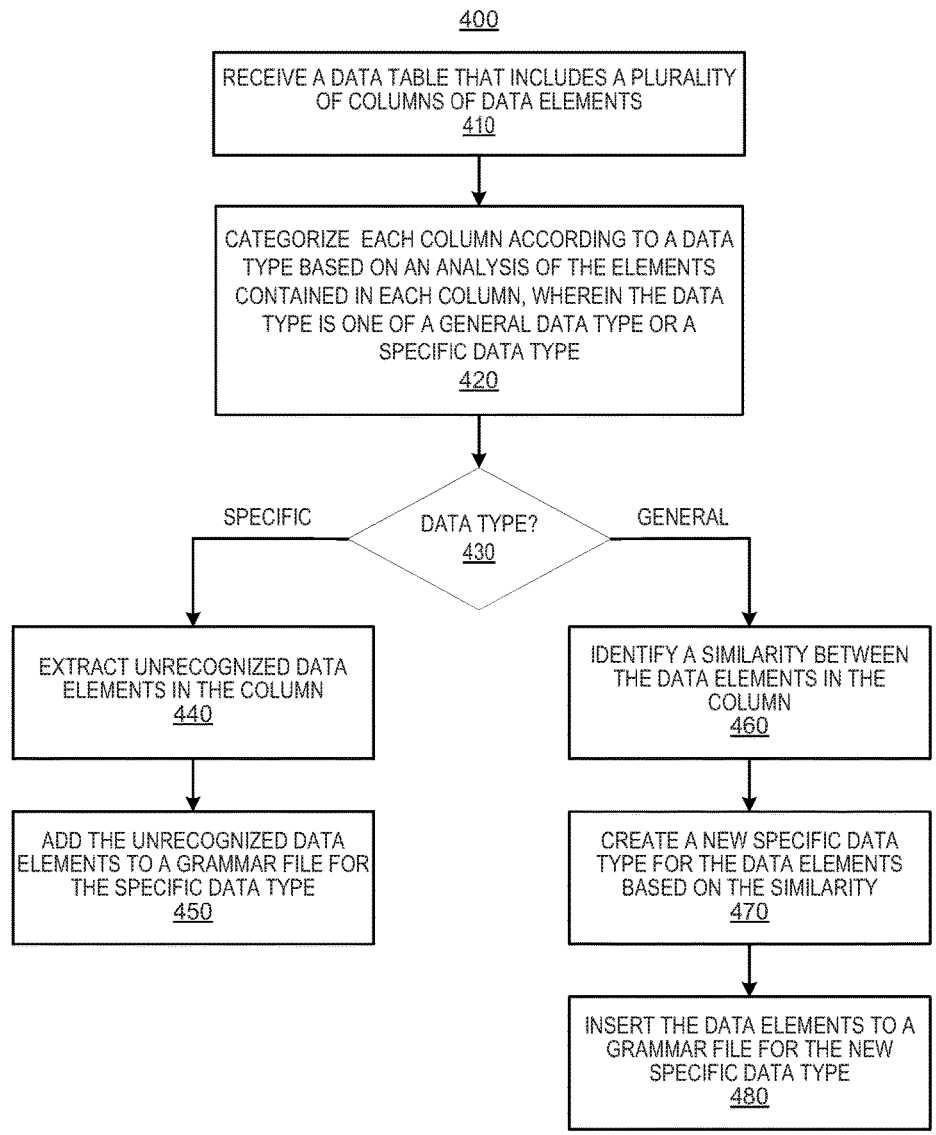
FIG. 4 shows a flow chart of a method for expanding a grammar file based on a data type of a column, according to an example of the present disclosure.
Figure 5:
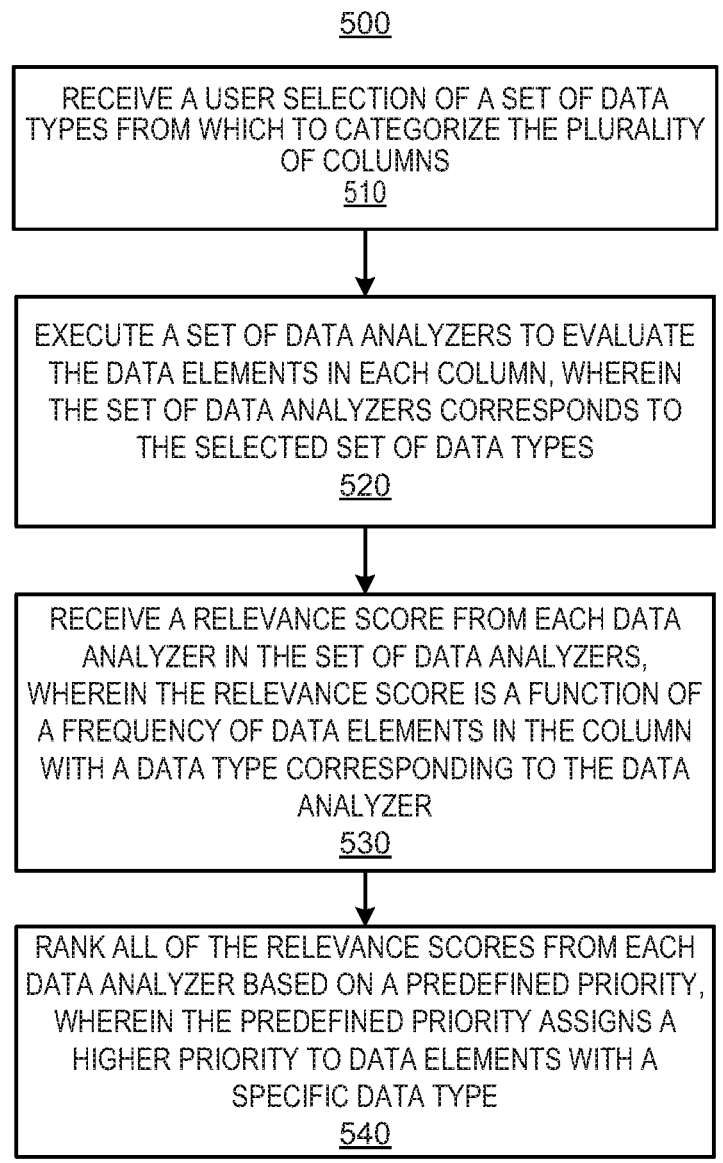
FIG. 5 shows a flow chart of a method for categorizing columns in a data table, according to another example of the present disclosure.

FIGS. 3-5 respectively depict flow diagrams of methods 300-500 for categorizing columns in a data table according to examples of the present disclosure. It should be apparent to those of ordinary skill in the art that the methods 300-500 represent generalized illustrations and that other operations may be added or existing operations may be removed, modified or rearranged without departing from the scopes of the methods 300-500.

With reference to FIG. 3, there is shown a flow chart of a method 300 for categorizing columns in a data table, according to an example of the present disclosure. The method 300 is implemented, for example, by the processor 102 of computing device 100 as depicted in FIG. 1.

In block 310, the categorization module 112, for instance, may categorize each of the columns according to a data type based upon an analysis of data elements (or entities) contained in each column with a grammar file (or dictionary), wherein the data type is one of a general data type (or non-named entity type) and a specific data type (or named entity type).

In block 320, the categorization module 112, for instance, may expand the grammar file by at least one of adding a data element (or entity) to the grammar file (or dictionary) in response to the column being categorized as a specific data type (or named entity type) and inserting a new data type to the grammar file in response to the column being categorized as a general data type (or non-named entity type).

The method 300 will now be described in greater detail with reference to the method 400 in FIG. 4. FIG. 4 shows a flow chart of a method 400 for expanding a grammar file based on a data type of a column, according to another example of the present disclosure. The method 400 is implemented, for example, by the processor 102 of computing device 100 as depicted in FIG. 1. In the following description of FIG. 4, the grammar file may equivalently be termed a dictionary, the specific data type may equivalently be termed a named entity type, and the general data type may equivalently be termed a non-named entity type.

In FIG. 4, the categorization module 112, for instance, may receive a data table 210 that includes a plurality of columns of data elements, as shown in block 410. The data table 210 may contain a plurality of columns to be categorized by the categorization module 112.

In block 420, the categorization module 112, for instance, may categorize each column of the plurality of columns according to a data type of the data elements contained in each column. The data type of the data elements may either be a general data type or a specific data type. A column may be assigned to be a general data type if the data elements in the column belong to a general category such as a numeric value, a string, and or a temporal value. On the other hand, a column may be assigned to be a specific data type if, for instance, a majority of the data elements in the column are recognized as named entities that belong to a predefined specific category such as such as persons, companies, locations, currencies, and the like.

In block 430, a determination may be made as to whether a column has been categorized as containing data elements of a general data type or of a specific data type, for instance, by the categorization module 112.

In response to the categorization module 112 categorizing a column to be the specific data type, the entity extraction module 114, for instance, may extract unrecognized data elements from the column as shown in block 440. The categorization module 112 may then add the unrecognized data elements to the grammar file for the specific data type as shown in block 450.

In response to the categorization module 112 categorizing a column to be the general data type, the categorization module 112 may revisit the column and identify a similarity between the data elements within the column as shown in block 460. If a similarity exists between the data elements contained in the column, the categorization module 112 may create a new or customized specific data type for these data elements based on the similarity as shown in block 470. The method 400 may present the newly created specific data type for user validation prior to inserting the data elements into the grammar file for the newly created specific data type, as shown in block 480. According to an example, the categorization module 112, for instance, may add an instance of a named entity extraction data analyzer to identify the newly created specific data type or may create a new data analyzer for the newly created specific data type.

With reference to FIG. 5, there is shown a flow chart of a method 500 for categorizing columns in a data table, according to an example of the present disclosure. The method 500 is implemented, for example, by the processor 102 of computing device 100 as depicted in FIG. 1. The method 500 discusses the categorization of each column according to a data type as shown in blocks 310 and 420 in greater detail, according to an example.

In block 510, the categorization module 112, for instance, may receive a user selection of a set of data types from which to categorize the plurality of columns. That is, the user may select which data types are of interest to the user and should be identified and categorized from the data table. In addition, the user may input the selections to the categorization module 112.

In block 520, the categorization module 112 may execute a set of data analyzers on the data elements in each column. According to an example, the set of data analyzers may correspond to the user selected data types. To analyze data elements of a specific data type, the categorization module 112 may execute a named entity extraction data analyzer. The named entity analyzer, for instance, may contain a grammar file for all of the user selected specific data types.

In block 530, the categorization module 112 may receive a relevance score from each data analyzer from the set of data analyzers. According to an example, the relevance score may be a function of a frequency of the data elements in the column having a data type that corresponds to a particular data analyzer. In other words, a data analyzer may output a relevance score indicating a percentage of the data elements in the column that are recognized as being a data type that corresponds to a particular data analyzer.

In block 540, the categorization module 112 may rank all of the relevance scores from each data analyzer based on a predefined priority. For instance, the predefined priority may assign a higher priority to a data type having higher relevance score. Additionally, the predefined priority may assign a higher priority to specific data types over general data types.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for categorizing columns in a data table, comprising:
    categorizing, by a processor, each of the columns of the data table as one of a specific data type and a general data type based upon an analysis of data elements contained in each column with a grammar file, wherein a column is categorized as a specific data type when a majority of the data elements in the column are recognized as named entities in a specific category of the grammar file, and a column is categorized as a general data type when the data elements in the column belong to a general category in the grammar file; and
    expanding, by the processor, the grammar file by at least one of:
        in response to a column being categorized as a specific data type, adding an unrecognized data element from the column to the grammar file; and
        in response to a column being categorized as a general data type, creating a new data type based on the data elements in the column and inserting the new data type into the grammar file.

2. The method of claim 1, wherein adding the unrecognized data element from the column to the grammar file further includes:
extracting the unrecognized data element from the column categorized as a specific data type; and
adding the unrecognized data element to the grammar file for the specific data type.

3. The method of claim 1, wherein inserting the new data type into the grammar file further includes:
identifying a similarity between the data elements in the column categorized as a general data type;
creating a new specific data type for the data elements based on the identified similarity;
validating that the new specific data type describes the data elements in the column; and
adding the data elements to the grammar file for the new specific data type.

4. The method of claim 1, wherein categorizing each of the columns further includes:
receiving a user selection of a set of data types from which to categorize the columns; and
executing a set of data analyzers to evaluate the data elements in each of the columns, wherein the set of data analyzers corresponds to the user selected set of data types.

5. The method of claim 4, wherein executing the set of data analyzers on the data elements in each of the columns further includes:
receiving a relevance score from each data analyzer in the set of data analyzers, wherein the relevance score is a function of a frequency of data elements in the column with a data type corresponding to the data analyzer; and
ranking all of the relevance scores from each data analyzer based on a predefined priority, wherein the predefined priority assigns a higher priority to data elements with a specific data type.

6. The method of claim 4, wherein the set of data analyzers includes a named entity extraction data analyzer for analyzing data elements of the specific data type.

7. The method of claim 1, wherein the general data type includes rows containing at least one of a numeral, a string, and a temporal value.

8. The method of claim 1, wherein the specific data type includes rows containing at least one of a name of a person, a name of a company, a name of a location, and a currency.

9. A computing device to categorize columns in a data table, comprising:
a processor;
a memory storing machine readable instructions that are executable by the processor to cause the processor to:
identify each of the columns in the data table according to a data type based upon an analysis of entities contained in each column with a dictionary, wherein the data type is one of a non-named entity type and a named entity type, wherein a column is identified as a named entity type when a majority of the entities in the column are recognized as named entities in a specific category of the dictionary, and a column is categorized as a non-named entity type when the entities in the column belong to a general category in the dictionary; and
augment the dictionary by at least one of:
in response to a column being categorized as a named entity type, adding an unrecognized entity from the column to the dictionary, and
in response to a column being categorized as a non-named entity type, creating a new data type from the entities in the column and inserting the new data type into the dictionary.

10. The computing device of claim 9, wherein to add the unrecognized entity to the dictionary, the machine readable instructions are to cause the processor to:
extract the unrecognized entity from in the column categorized as a named entity type; and
add the unrecognized entity to the dictionary for the named entity type.

11. The computing device of claim 9, wherein to insert the new data type into the dictionary, the machine readable instructions are to cause the processor to:
identify a similarity between the entities in the column categorized as a non-named entity type;
create a new named entity type for the entities in the column categorized as a non-named entity type based on the identified similarity;
validate that the new named entity type describes the entities in the column categorized as a non-named entity type; and
add the entities to the dictionary for the new named entity type.

12. The computing device of claim 9, wherein to identify each of the columns according to a data type, the machine readable instructions are to cause the processor to:
receive a user selection of a set of data types from which to identify the data types for the entities in each of the columns, and
execute a set of data analyzers on the entities in each of the columns, wherein the set of data analyzers corresponds to the user selected set of data types;
receive a relevance score from each data analyzer, wherein the relevance score is a function of a frequency of entities in the column with a data type corresponding to the data analyzer; and
rank all of the relevance scores from each data analyzer based on a predefined priority, wherein the predefined priority assigns a higher priority to named entity types.

13. A non-transitory computer readable medium to categorize columns in a data table, including machine readable instructions executable by a processor to:
identify a data type for each of the columns based upon an evaluation of data elements contained in each column with a dictionary, wherein the data type is one of a general data type and a specific data type, wherein a column is identified as a specific data type when a majority of the data elements in the column are recognized as named entities in a specific category of the dictionary, and a column is categorized as a general data type when the data elements in the column belong to a general category in the dictionary;
in response to a column being identified as a specific data type, extract unrecognized data elements in the column and add the unrecognized data elements to the dictionary for the specific data type; and
in response to a column being identified as a general data type, identify a similarity between the data elements in the column and create a new specific data type to add to the dictionary based on the similarity of the data elements.

14. The non-transitory computer readable medium of claim 13, wherein to identify the data type for each of the columns, the machine readable instructions are executable by the processor to:
receive a user selection of a set of data types from which to identify each of the columns; and execute a set of data analyzers on the data elements in each of the columns, wherein the set of data analyzers corresponds to the user selected set of data types.

15. The non-transitory computer readable medium of claim 14, wherein to execute the set of data analyzers on the data elements, the machine readable instructions are executable by the processor to:
   receive a relevance score from each data analyzer from the set of data analyzers; and
   rank all of the relevance scores from each data analyzer based on a predefined priority.

16. The non-transitory computer readable medium of claim 13, wherein, after creating the new specific data type, the machine readable instructions are executable to cause the processor to:
   validate that the new specific data type describes the data elements in the column categorized as a general data type; and
   add the data elements of the column to the dictionary for the new specific data type.

* * * * *